(12) United States Patent
Marodis

(10) Patent No.: US 9,505,474 B1
(45) Date of Patent: Nov. 29, 2016

(54) LOW-DISTURBANCE TROLLING TRANSDUCER MOUNT

(71) Applicant: Michael G. Marodis, Biloxi, MS (US)

(72) Inventor: Michael G. Marodis, Biloxi, MS (US)

( * ) Notice: Subject to any disclaimer, the term of this patent is extended or adjusted under 35 U.S.C. 154(b) by 0 days.

(21) Appl. No.: 14/871,376

(22) Filed: Sep. 30, 2015

(51) Int. Cl.
*B63H 5/16* (2006.01)
*B63H 20/00* (2006.01)
*A01K 97/00* (2006.01)
*G10K 11/00* (2006.01)
*G01S 15/96* (2006.01)

(52) U.S. Cl.
CPC ............ *B63H 5/165* (2013.01); *A01K 97/00* (2013.01); *B63H 20/007* (2013.01); *G01S 15/96* (2013.01); *G10K 11/006* (2013.01)

(58) Field of Classification Search
CPC .... B63H 5/165; B63H 20/007; A01K 97/00; G01S 15/96; G10K 11/006
See application file for complete search history.

(56) References Cited

U.S. PATENT DOCUMENTS

| | | | |
|---|---|---|---|
| 2,054,374 A | 9/1936 | Fuller | |
| 2,140,099 A | 12/1938 | Wise | |
| 2,319,640 A | 5/1943 | Sink | |
| 2,355,842 A | 8/1944 | Arado | |
| 2,470,874 A | 5/1949 | Sidney | |
| 3,025,825 A | 3/1962 | Martinson | |
| 4,152,690 A * | 5/1979 | Veatch | B63C 7/26 248/278.1 |
| 4,565,533 A | 1/1986 | Springer | |
| 4,718,871 A | 1/1988 | Mendelevitch | |
| 4,826,461 A | 5/1989 | Newman | |
| 4,902,255 A | 2/1990 | Faunda | |
| 4,926,399 A * | 5/1990 | Hickman | G10K 11/006 248/230.9 |
| 5,344,346 A | 9/1994 | Griffin | |
| 5,516,315 A | 5/1996 | Griffin | |
| 5,573,221 A * | 11/1996 | Reeves | B63H 20/007 248/640 |
| 5,664,977 A | 9/1997 | Dinkowitz | |
| 5,673,643 A | 10/1997 | Poppa | |
| 6,490,229 B1 * | 12/2002 | Caver | G10K 11/006 367/173 |
| 6,899,574 B1 * | 5/2005 | Kalis et al. | G10K 11/006 367/173 |
| 7,036,451 B1 * | 5/2006 | Hutchinson | B63B 17/00 114/364 |
| 7,971,839 B2 * | 7/2011 | Upchurch | B63B 25/002 248/121 |
| 8,826,584 B1 * | 9/2014 | Hernandez et al. | A01K 91/08 114/255 |
| 8,961,249 B2 | 2/2015 | Stearn | |
| 2002/0044500 A1 * | 4/2002 | Hansen | G01S 15/88 367/173 |
| 2013/0016588 A1 * | 1/2013 | O'Dell | G10K 11/006 367/173 |

* cited by examiner

*Primary Examiner* — Stephen Avila
(74) *Attorney, Agent, or Firm* — Keaty Law Firm LLC

(57) ABSTRACT

A low-disturbance trolling transducer mount system and method for shallow-water fishing and similar situations presenting a need to navigate through vegetation and obstructions, protecting against obstructions, without disturbing or destroying the fish-inhabited vegetation, without disturbing the water around the vegetation, placing and maintaining the transducer in the proper relation to the vegetation and to the trolling motor to avoid entanglement and turbulence affecting reliability of readings, including prevention of the trolling motor hindering the operation of the transducer, or vice versa, allowing for movement of the transducer around obstructions and heavy vegetation, with a streamlined design and durable construction.

20 Claims, 9 Drawing Sheets

LOW-DISTURBANCE TROLLING TRANSDUCER MOUNT

BACKGROUND OF THE INVENTION

This invention provides a low-disturbance trolling transducer mount system and method for shallow-water fishing and similar situations presenting a need to navigate through vegetation without disturbing the vegetation or the water around the vegetation, while protecting the transducer and the trolling motor, and while providing the correct and optimum operations of the transducer and the trolling motor, including prevention of the trolling motor hindering the operation of the transducer, or vice versa.

Transducers, some of which are also known as "fish finders" are available to provide information about locations, distances and other qualities or quantities of things under water, such as the bottom surface, vegetation, obstructions, and fish. A transducer must be mounted underwater in a proper place and in a proper way to properly sense and report the data, and to avoid damage. For example, a transducer should not be mounted where the turbulence generated by a propeller can prevent accurate readings.

Trolling motors are available to provide slow propulsion to a waterborne vessel with a minimum of noise, vibration, wake, or turbulence.

Sub-surface vegetation is a good habitat for fish and a good location for fishing. It is not desirable to disturb such vegetation my cutting or pulling it up, or even to move it around very much, because such movement and turbulence disturbs the fish, because entanglement in vegetation can foul the trolling motor, necessitating disruptive remedial actions, and because turbulence prevents proper operation and correct readings from the transducer.

There is a need for a system and method for mounting a transducer in a correct relationship to a trolling motor for proper operation and for avoiding and protecting against impact or entanglement of either with vegetation or obstructions, with minimum cutting, tearing, and pulling, and resulting undesirable turbulence.

Numerous patents have been issued disclosing a bumper-like apparatus for protection of a motor, but all such patents differ in the purpose of the apparatus (for example, varying between protection, propulsion, or security), and the shape and manner of attachment to the shaft.

U.S. Pat. No. 4,902,255 issued on Feb. 20, 1990 to Richard E. Faunda for "Weedguard for Electric Trolling Motor" discloses a weedguard for attachment to electric trolling motors having a motor housing and a motor support shaft, the weedguard comprising a lower triangular frame member portion and an upper arm portion, the triangular frame portion having a flange for attachment to the motor housing so that the triangular frame portion has one apex toward the front of the motor housing and extends downwardly and rearwardly from the apex with respect to the motor housing; the upper arm portion being secured to the triangular frame portion at that apex and extending upwardly and forwardly therefrom, and a rearward extension member extending from the upper arm portion toward the motor shaft for attachment to the motor shaft.

U.S. Pat. No. 4,565,533 issued on Jan. 21, 1986 to Manfred H. Springer for "Boat Propeller Guard" discloses a guard comprised of a main rib with a shock absorbing end portion and a resilient rib which is secured to the main rib such that, when the guard is attached to an outboard motor which is mounted on a boat and which is submerged in water, the resilient rib is disposed forward of the end portion. The forward rib and the end portion extend one behind the other in the direction of travel of the boat so that the forward rib imparts additional shock absorbing properties to the guard. Further shock absorbing resilient ribs and accurate funneling bands to strengthen the guard may be secured to the main rib.

U.S. Pat. No. 5,673,643 issued on Oct. 7, 1997 to Michael J. Poppa for "Hydrofoil Accessory For Marine Propulsion Device" discloses a hydrofoil wing structure is disclosed to be employed as an accessory for a marine propulsion device, to be disposed above and mostly aft of the propelling means of such a device, to contour and concentrate the kinetic energy in the hydrodynamic vortex created by the propelling means; to reduce turbulence, vibration and noise by reflecting acoustic energy downwardly from the surface of the water; to increase the efficiency of such a device powered by an electric battery; to improve the steering and maneuverability of the vessel by providing a rudder for the device; and to serve as a guard preventing the propelling means from entanglement in vegetation or its damage from submerged objects, and to similarly shield a sonar transducer or other instrument used in conjunction with the device for finding fish or gauging the depth of the water.

U.S. Pat. No. 4,826,461 issued on May 2, 1989 to Neil A. Newman for "Propeller Protector" discloses a propeller protector provided by a two-piece hub structure. Each piece has an inner arcuate portion substantially conforming to the side of the torpedo housing of the marine drive. Each piece has a pair of fins extending radially outwardly from the inner accurate portion and spaced axially forward of the propeller. Top rear, bottom rear and front clamps mount the two pieces to the torpedo housing on opposite sides thereof.

U.S. Pat. No. 5,344,346 issued on Sep. 6, 1994 to Clarence A. Griffen for "Driveshaft Housing Attachment" discloses an apparatus for improving the efficiency of a propulsion unit having a driveshaft housing depending from the stern of a boat, while protecting swimmers and the propulsion unit. A plate member has an upper end to be positioned forward of a driveshaft housing and to depend accurately downwardly and rearwardly to terminate in a trailing lower end below a propeller. The plate member tapers outwardly along lateral edges from the upper end to the lower end to divert swimmers around and under a housing and a propeller attached thereto. The plate member reacts to the passage of water when under way to urge the boat's stern upwardly toward a more efficient operating position. The outer corner areas of the upper and lower ends are connected by outwardly curved rods to define a protection zone to protect body parts of swimmers by diverting them outwardly and downwardly under a propeller.

U.S. Pat. No. 2,470,874 issued May 24, 1949 to Harry A. Sidney for "Propeller Guard for Outboard Motors" discloses knife-like cutter members capable of moving through the water with minimum resistance and will not become entangled in weeds, but will move with an effective shearing action against any obstacles in its path, whether comprising weeds or submerged tree branches, and in which the blades can have a minimum cross section and capability of instant adjustment to a raised position above the water line when the propeller is operating in water free of weeds.

U.S. Pat. No. 2,140,099 issued on Dec. 13, 1938 to W. H. Wise for "Outboard Motor Propeller Guard" discloses a propeller and a fin at the lower end of said housing comprising a hanger rod, an offset upper end on said rod, a two-part separable clamp carried by said end and embracing the said housing, a curved bifurcated lower end on said rod and straddling the fin, a fastener separably securing the lower end to said fin, and a plurality of vertically spaced guard arms extending laterally from opposite sides of said rod and along opposite sides of the propeller in spaced relation to the path of rotation of said propeller and a hanger rod, an off-set upper end on said rod, a two-part separable clamp carried by said end and embracing the said housing, a curved bifurcated lower end on said rod and straddling the fin, a fastener separably securing the lower end to said fin, and a plurality of vertically spaced guard arms extending laterally from opposite sides of said rod and along opposite sides of the propeller in spaced relation to the path of rotation of said propeller, the lowermost arms being inset with respect to the uppermost arms of the series thereof.

U.S. Pat. No. 2,054,374 issued Sep. 15, 1936 to H. H. Fuller for "Guard For Outboard Motors" discloses a guard which offers protection to the full propeller diameter but which at the same time does not reduce the efficiency of the propeller. By means of a simple clamp arrangement guards constructed in accordance with the invention may be easily installed on any type of outboard motor and can likewise be easily detached when not needed, as for example, when navigating only in deep waters and a guard which is so shaped or curved it will easily pass over solid objects and tend off weeds or light floating obstacles. a guard which will spring under impact—but will return to its-original shape and which is flexible to a degree that will minimize the impact between the motor and obstacles encountered. This is of importance, for while guards for outboard motors are known, they are as a rule not flexible, and, consequently, the impact upon striking a solid object often breaks the guard or the propeller shaft or blades. The invention further has for an object the provision of a guard for outboard motors, which will not wedge between two rocks.

U.S. Pat. No. 2,355,842 issued Aug. 15, 1944 to J. G. Arado for "Combined Cutter, Distributor, and Protector for Outboard Motors" discloses a combined cutter, distributor and protector, which successfully solves this long-existing problem. A device of this kind adapted to be readily and quickly attached and detached by unskilled hands to the well-known types of outboard motors, which device is provided with means for first cutting the vegetation and then conveying or distributing the vegetation outwardly and away from the propeller and prevents the vegetation from being sucked in or drawn into the propeller and becoming entwined therewith. A device with means for readily and quickly mounting it on an out-board motor in such a manner as to prevent the device or parts thereof from being thrown into contact with the rotating propeller blades in the event the fastening means become loose due to the tremendous vibration set up by the motor.

U.S. Pat. No. 2,319,640 issued on May 18, 1943 to B. A. Sink for "Propeller Guard" discloses an improved and highly effective shield for the propeller of an outboard motor for the purpose of preventing snagging of the propeller in weeds or being damaged by striking submerged objects; and for improving the efficiency of the propeller by minimizing currents and turbulence adjacent the same and thereby add to the efficiency thereof and to provide a shield of the foregoing character which is extremely simple and inexpensive in its parts and may be readily and quickly applied to types of outboard motors now in extensive use for the foregoing purposes. Second, to provide a shield of the foregoing character which is extremely simple and inexpensive in its parts and may be readily and quickly applied to types of outboard motors now in extensive use for the foregoing purposes. Third, to provide a combined weed guard or shield for a propeller for water craft which functions electively to prevent' undue turbulence adjacent the propeller and which co-acts with the cavitation plate of the motor in greatly increasing the efficiency of operation of the propeller. Fourth, to provide a guard or shield of the type described having exceedingly simple provisions for removably securing the same on conventional types of outboard motors.

U.S. Pat. No. 3,025,825 issued Mar. 20, 1962 to R. H. Martinson for "Weed, Etc., Guard For Outboard Motors" discloses a weed guard for outboard motors that may be mounted on the lower unit of an outboard motor and positioned forwardly thereof and in alignment with the propulsion unit of the outboard motor so that the propulsion unit of the outboard motor will not become fouled with marine vegetation. A further object of this invention, in accordance with the immediately preceding object, is to provide a weed guard that will also project below the lower extremity of the lower unit of an outboard motor and be constructed of a resilient material whereby a submerged object in alignment with the movement of the lower portion of the "'ice lower unit of the outboard motor will be engaged by the resilient weed guard rather than the lower unit of the outboard motor itself thus enabling the weed guard to absorb a considerable portion of the impact and to pivot the outboard motor to raise the lower unit thereof above the submerged object. Still another object of this invention is to provide a weed guard in accordance with the preceding objects, which will offer a minimum amount of resistance to its passage through water. A further object of this invention is to construct the arms of the fan-shaped member of a material sufficiently rigid to resist bending under light impact but sufficiently resilient to bend appreciably upon heavy impact so that extremely heavy impacts may be more readily absorbed thereby. A final object to be specifically enumerated herein is to provide a device which will conform to conventional forms of manufacture, be of simple construction and easy to secure to various types of outboard motor so as to provide a device that will be economically feasible, durable in construction and simple to use.

U.S. Pat. No. 5,516,315 issued May 14, 1996 to Clarence A. Griffen for "Driveshaft Housing Apparatus" discloses an apparatus for further improving the efficiency of a propulsion unit having a driveshaft depending from the stern of a boat, while protecting flora and fauna in the water as well as the propulsion unit. A plate member has an upper end adapted to be positioned forward of a driveshaft housing, and to depend downwardly and rearwardly to terminate in a trailing lower end below a propeller. The plate member tapers outwardly along lateral edges from the upper end to the lower end to divert flora and fauna around and under a housing and a propeller attached thereto. A lower portion of the plate member is divided into a plurality of spaced plate-like components defining passageways there between to enable water to flow there through for more efficient operation of a propeller. At the same time, the forward surfaces of the plate-like components react with passage of water when under way to urge a boat's stern upwardly to a more efficient hull operating position.

U.S. Pat. No. 4,718,871 issued Jan. 12, 1988 to Eli Mendelevitch for "Aquatic Growth Cutter" discloses an upper and a lower blade are fixed together at an adjustable angle and have means for mounting same on the leading edge of the propeller drive housing of an inboard/outboard motor to cut kelp and other seaweed which would otherwise foul the prop and clog the cool, sea water input vents. The cutter has adjustable brackets which will accommodate a wide variety of different types of propeller drive housings, and will accommodate outboard motors as well as inboard motors, and will even fit on the advance edge a sailboat keel. In one embodiment, it has a combination brace/mesh screen which extends from the cutter to the propeller drive housing in front of the cooling water inlets to keep bits of seaweed and other debris from entering and clogging the cooling system, causing overheating the destruction of the motor.

U.S. Pat. No. 5,664,977 issued Sep. 9, 1997 to Paul J. Dinkowitz et al. for "Boat Propeller Sled" discloses a boat propeller sled comprising a spine, straps attached to the spine, and rails attached to the spine. The straps are sized to fit around an outboard motor lower unit, and to securely attach the spine to the lower unit. Each rail comprises a base attached to the spine, a forward ramp attached to the base, a runner attached to the forward ramp, and a rear ramp attached to the runner. In the preferred embodiment, the bases are attached to the spine at an angle of approximately ninety degrees, the forward ramps slope forward at an angle of approximately sixty degrees relative to the horizon, the runners are substantially horizontal, and the rear ramps slope upwards towards the rear at an angle of approximately thirty degrees relative to the horizon.

U.S. Pat. No. 8,961,249 issued Feb. 24, 2015 to Frederick Stearn for "Guard and Method for Protecting Wildlife" discloses a guard for protecting wildlife, which mounted on an outboard motor having a propeller and keel below an anti-ventilation plate. The guard has a spaced pair of bars each with an upper section, a lower section and between them a midsection. The upper sections of the bars can be attached to opposite sides of the anti-ventilation plate in order to position the lower sections below the propeller and keel. The lower sections have a smooth, projection-free streamline for avoiding snagging on sea weed.

SUMMARY OF THE INVENTION

The present invention provides a low-disturbance trolling transducer mount system and method for shallow-water fishing and similar situations presenting a need to navigate through vegetation and obstructions, protecting against obstructions, without disturbing or destroying the fish-inhabited vegetation, without disturbing the water around the vegetation, placing and maintaining the transducer in the proper relation to the vegetation and to the trolling motor to avoid entanglement and turbulence affecting reliability of readings, including prevention of the trolling motor hindering the operation of the transducer, or vice versa, allowing for movement of the transducer around obstructions and heavy vegetation, with a streamlined design and durable construction.

The present invention solves existing problems of damage to transducers and trolling motors from vegetation and obstructions, false readings from transducers due to turbulence, disturbance of fish due to turbulence, and damage to fish-inhabited vegetation.

BRIEF DESCRIPTION OF DRAWINGS

Reference will now be made to the drawings, wherein like parts are designated by like numerals, and wherein.

DETAILED DESCRIPTION OF THE INVENTION

Figure 12:
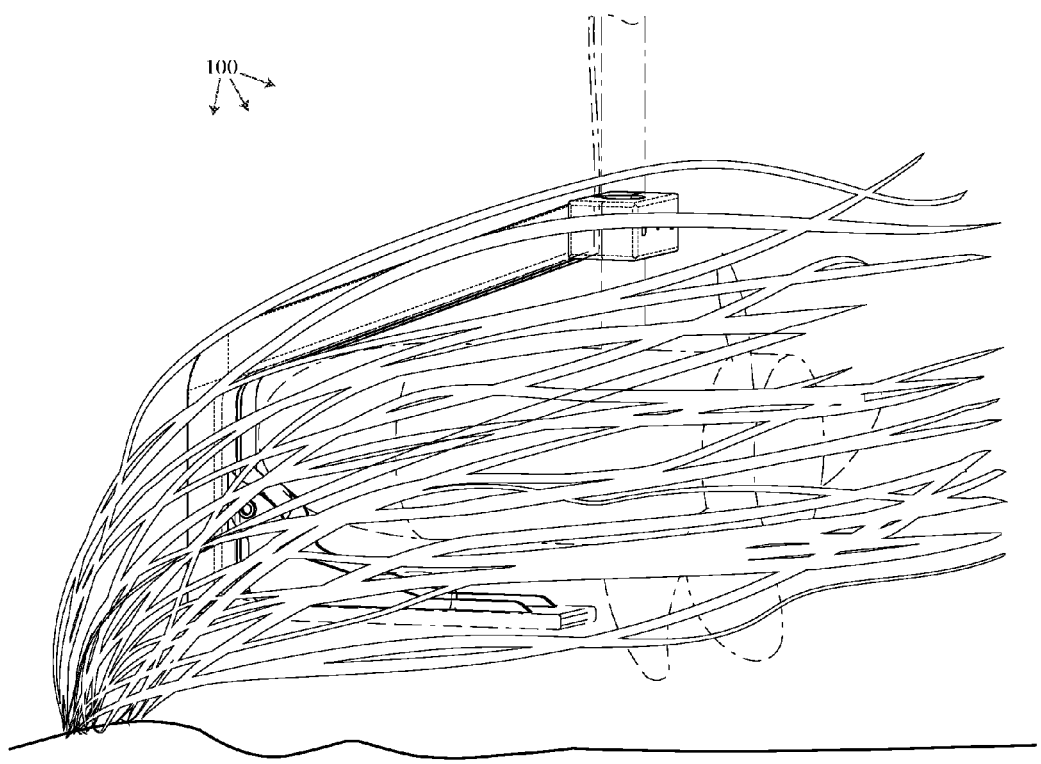
FIG. 12 is a schematic view of the low-disturbance trolling transducer mount of the present invention in use in shallow-water vegetation.

Referring to FIG. 12 illustrating the invention in use in shallow water and potentially entangling vegetation, my low-disturbance trolling transducer mount 100 provides for placing and maintaining the transducer in the proper relation to the vegetation and to the trolling motor to avoid entanglement and turbulence affecting reliability of readings, including prevention of the trolling motor hindering the operation of the transducer, or vice versa, protecting against entanglement and impact with vegetation and obstructions, without disturbing or destroying the fish-inhabited vegetation, without disturbing the water around the vegetation, and allowing for movement of the transducer around obstructions and heavy vegetation.

Figure 1:
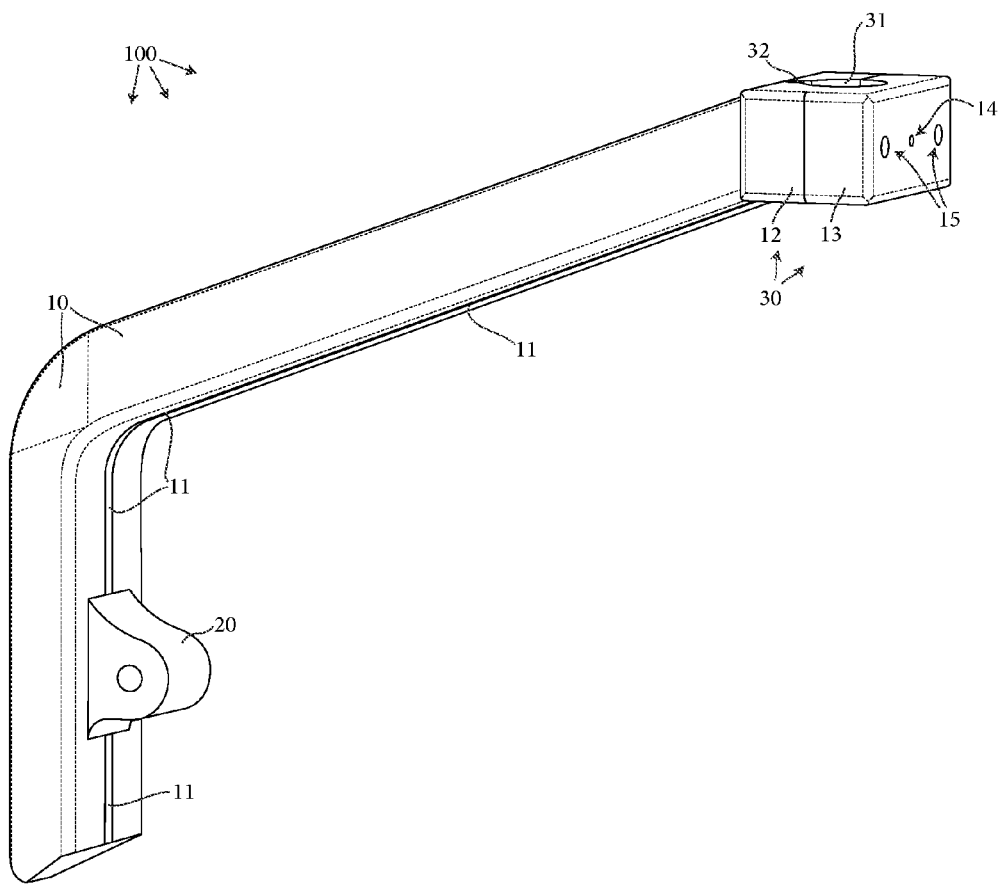
FIG. 1 is an isometric view of the low-disturbance trolling transducer mount of the present invention.
Figure 2:
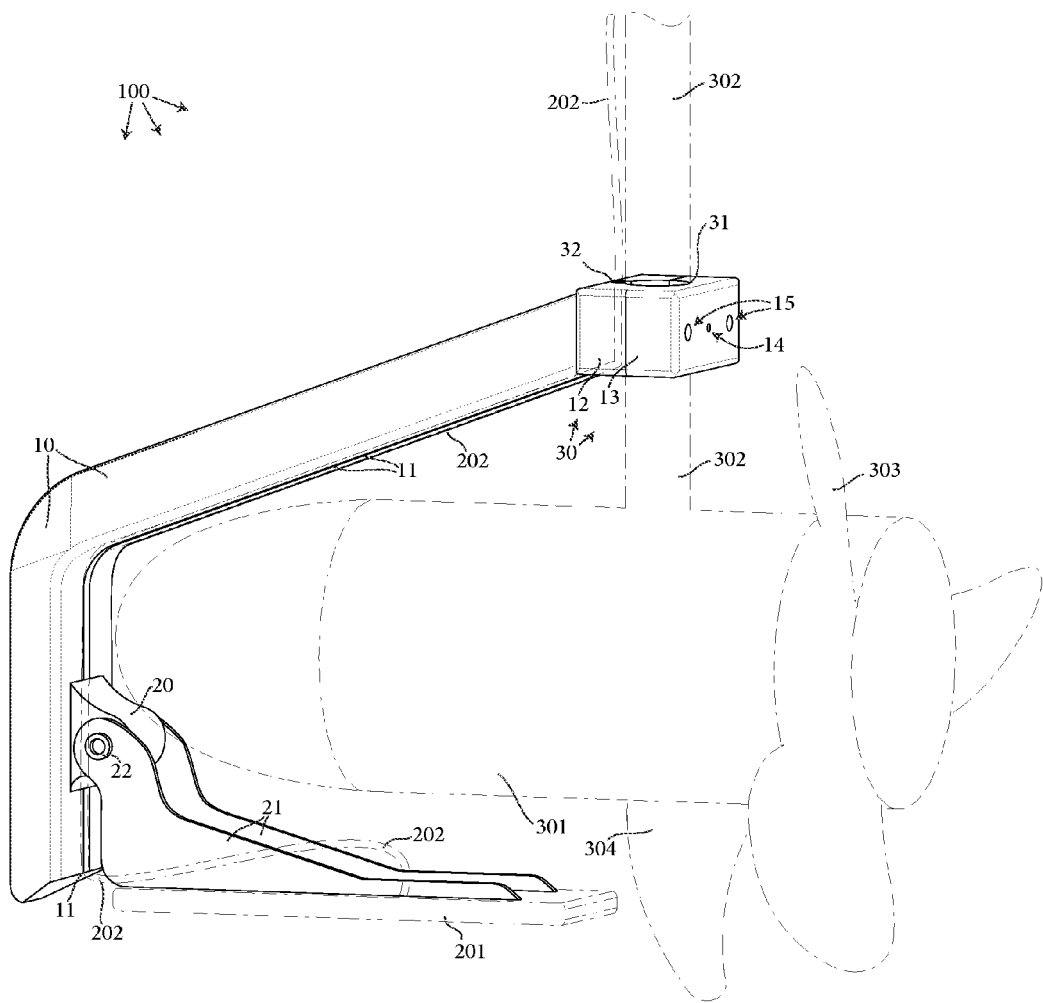
FIG. 2 is an isometric view of the low-disturbance trolling transducer mount of the present invention, showing the relationship to the transducer and trolling motor.
Figure 3:
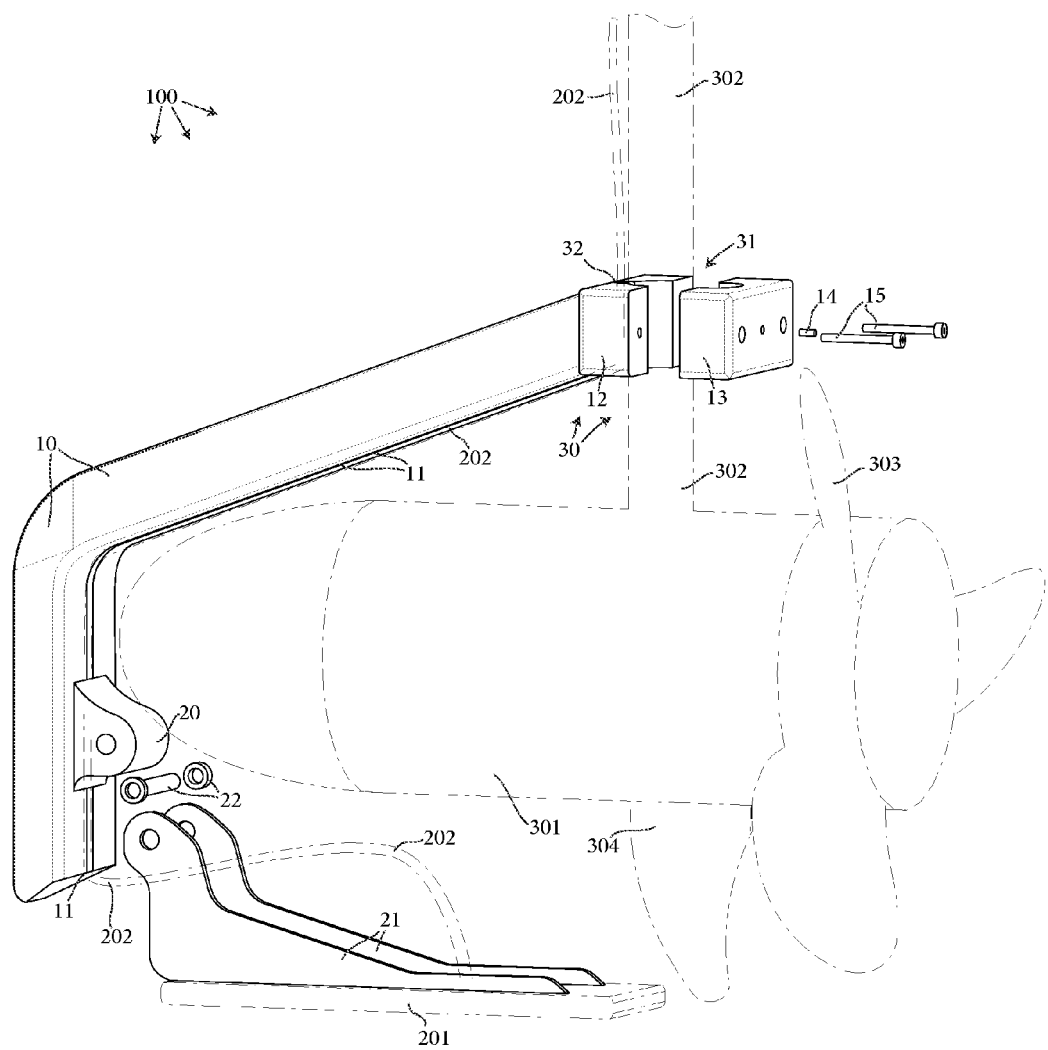
FIG. 3 is an exploded isometric view of the low-disturbance trolling transducer mount of the present invention, showing the relationship to the transducer and trolling motor.

Referring to FIG. 1, FIG. 2, & FIG. 3, my low-disturbance trolling transducer mount 100 provides a mount frame 10 of a smooth shape and with smooth features and a lack of snag-prone features such that the mount frame moves through underwater vegetation and obstructions easily and with a minimum of cutting, tearing, pulling, disturbance, or turbulence. The mount frame 10 travels in front of, and protects, the transducer 201 and the trolling motor body 301, from entanglement and impact from vegetation and obstructions.

The low-disturbance trolling transducer mount 100 is used with a typical transducer 201 having a typical transducer cable 202 to convey the transducer's data up out of the water and into a display onboard the vessel.

The low-disturbance trolling transducer mount 100 is used with a typical trolling motor, typically having a trolling-motor body 301, a trolling-motor shaft 302, a trolling-motor propeller 303, and a trolling-motor skag 304. The trolling-motor shaft 302 extends up out of the water where it can be reached, and the trolling motor can be steered and controlled, from onboard the vessel.

Referring briefly to FIG. 7, FIG. 8, FIG. 9, & FIG. 10, front and top views with and without indications of the transducer and trolling motor, the mount frame 10 presents a smooth leading surface for the entire assembly, in use, traveling through the water.

The mount frame 10 is smoothly bent at an angle of approximately 70 degrees from vertical, with the exact angle, within 10 degrees either way, not being critical to the correct operation of the invention. The smoothly bent configuration of the mount frame 10 allows some of the force of impact with an obstruction to be absorbed by the mount frame 10 or transferred through the shaft connector 30 to the trolling-motor shaft 302. Taking as the fore end the leftmost and lowermost end as illustrated, and as the aft end the rightmost and uppermost end as illustrated, the mount surface has a fore-and-top surface and an aft-and-bottom surface. It is the fore-and-top surface which is the leading surface in use, moving through vegetation and obstructions in the water.

Figure 5:
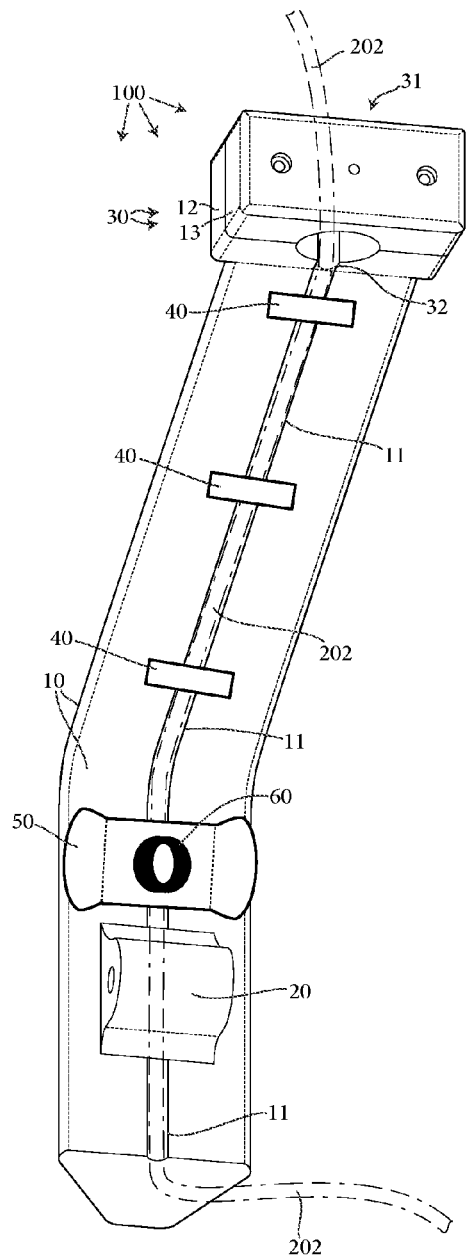
FIG. 5 is an underside isometric view of an embodiment of the low-disturbance trolling transducer mount of the present invention, having hold-downs, a safety bracket, and a safety bumper.

The mount frame 10 has a mount channel 11 in the aft-and-bottom surface which accommodates the transducer cable 202 along a protected path up, out of the water, and into the vessel. Referring briefly to FIG. 5, hold-downs 40 can optionally be provided to secure and further protect the transducer cable 202 in the mount channel 11.

At the aft end of the mount frame 10 is located a shaft connector 30 comprising a connector fore-piece 12 fixed to the aft end of the mount frame 10 and having smooth and radiused inner and outer corners and surfaces presented in the direction of travel thorough the water when in use, for avoidance of potential snagging or entanglement with vegetation or obstructions, and a connector aft-piece 13 which is connected to the connector fore-piece 12 by one or more connector closures 15 such as a screw or bolt. When assembled, the shaft connector defines a shaft opening 31 to accommodate the trolling-motor shaft 302, and a connector channel 32 to accommodate the transducer cable 202 emerging from the mount channel 11 at the aft end of the mount frame 10. The shaft connector 30 is assembled by placing the transducer cable 202 into and extending through the connector channel 32, placing the trolling-motor shaft 302 into and extending through the shaft opening 31, connecting the assembly with one or more connector closures 15, and optionally further securing the trolling motor shaft 302 with a shaft setscrew 14. The trolling-motor shaft is placed and secured so that the direction of travel of the trolling motor is collinear with the direction of travel of the mount frame 10. When assembled, in use, the mount frame 10 and therefore the entire low-disturbance trolling transducer mount 100 will travel in the same direction and will remain forward of the trolling motor and of the transducer.

A transducer-arm anchor 20 is fixed to the mount frame 10 on the aft-and-bottom surface near the fore end. One or more transducer arms 21 are attached to the transducer 201, and then are rotatably attached to the transducer-arm anchor 20 by means of a transducer-arm fastener 22 which allows constrained rotational movement of the transducer 201 about the transducer-arm anchor 20. The allowance of this rotational movement allows the transducer to be pushed out of the way of obstructions or of the bottom surface, when needed.

Figure 4:
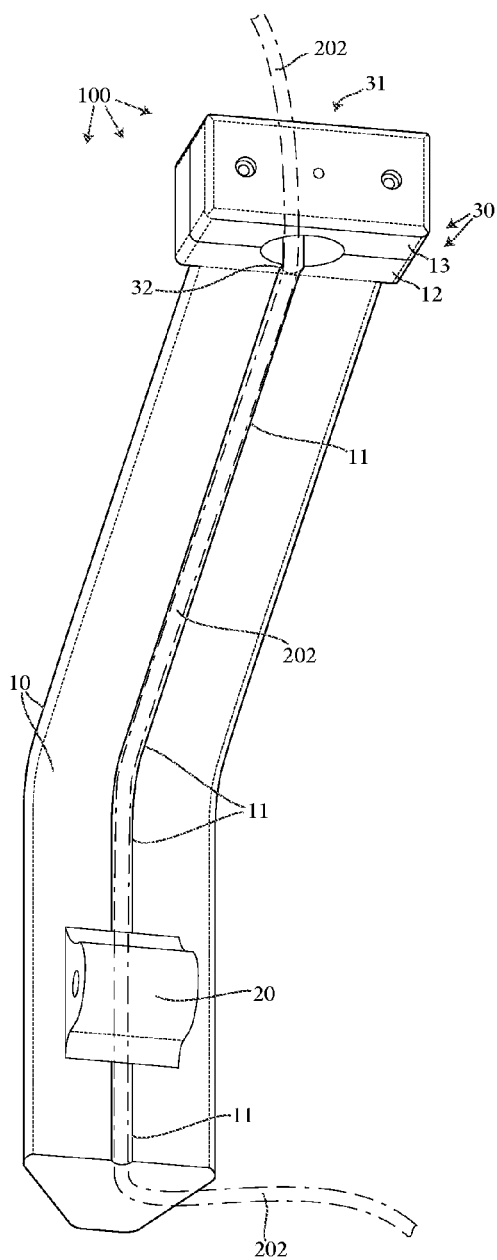
FIG. 4 is an underside isometric view of the low-disturbance trolling transducer mount of the present invention, showing the relationship to the transducer cable.

Referring to FIG. 4 & FIG. 5, the transducer cable 202 is routed through the mount channel 11 in the mount frame and the connector channel 32 in the shaft connector 30 up out of the water and onboard the vessel to connect with a display unit. Optionally, hold-downs 40 can be provided to further secure and connect the transducer cable 202.

Figure 6:
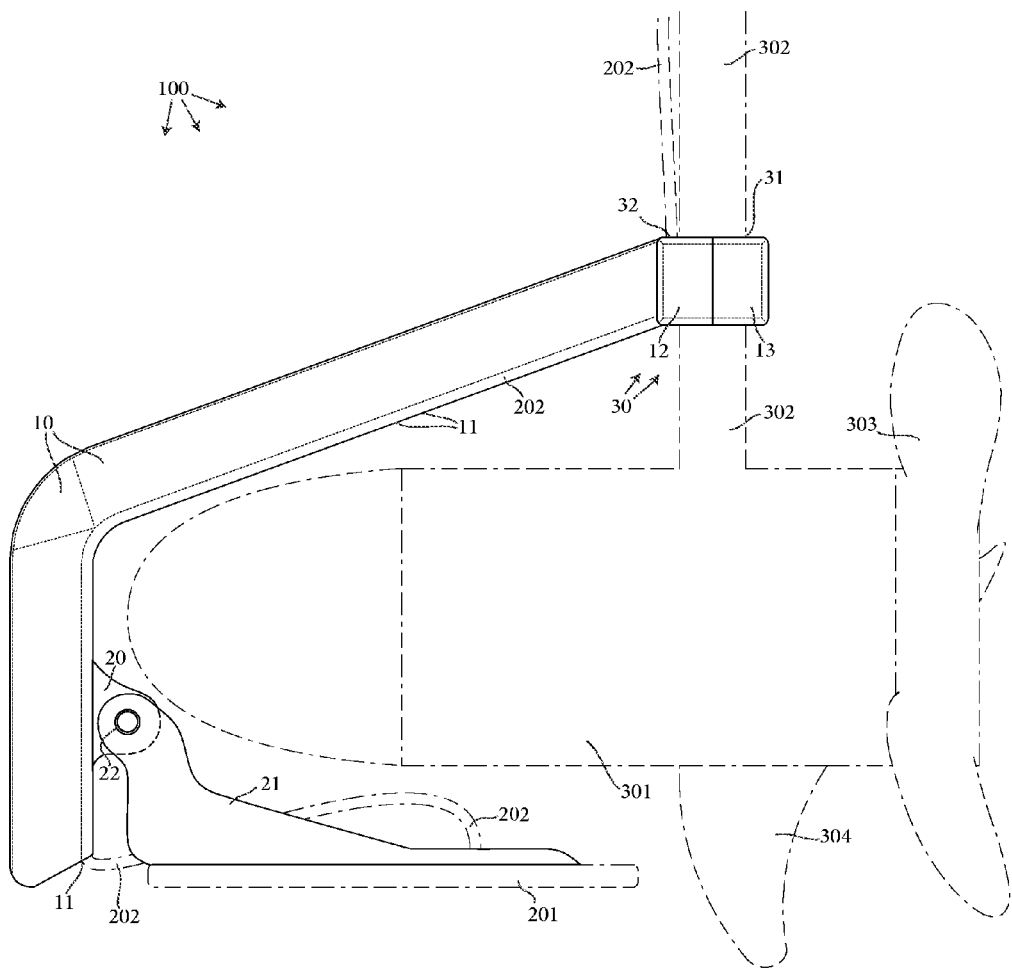
FIG. 6 is a side view of the low-disturbance trolling transducer mount of the present invention, showing the relationship to the transducer and trolling motor.
Figure 7:
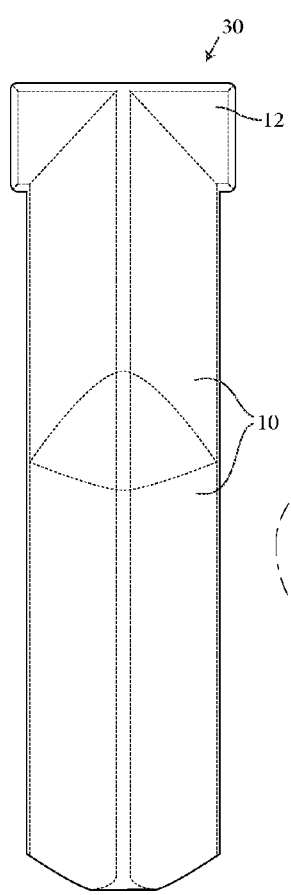
FIG. 7 is a front view of the low-disturbance trolling transducer mount of the present invention.
Figure 8:
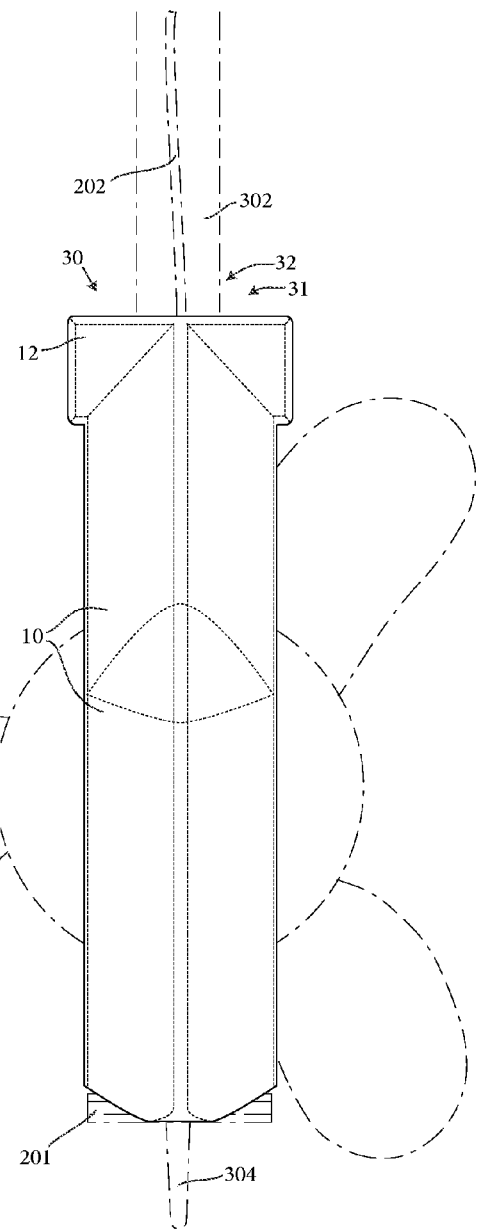
FIG. 8 is a front view of the low-disturbance trolling transducer mount of the present invention, showing the relationship to the transducer and trolling motor.
Figures 9, 10:
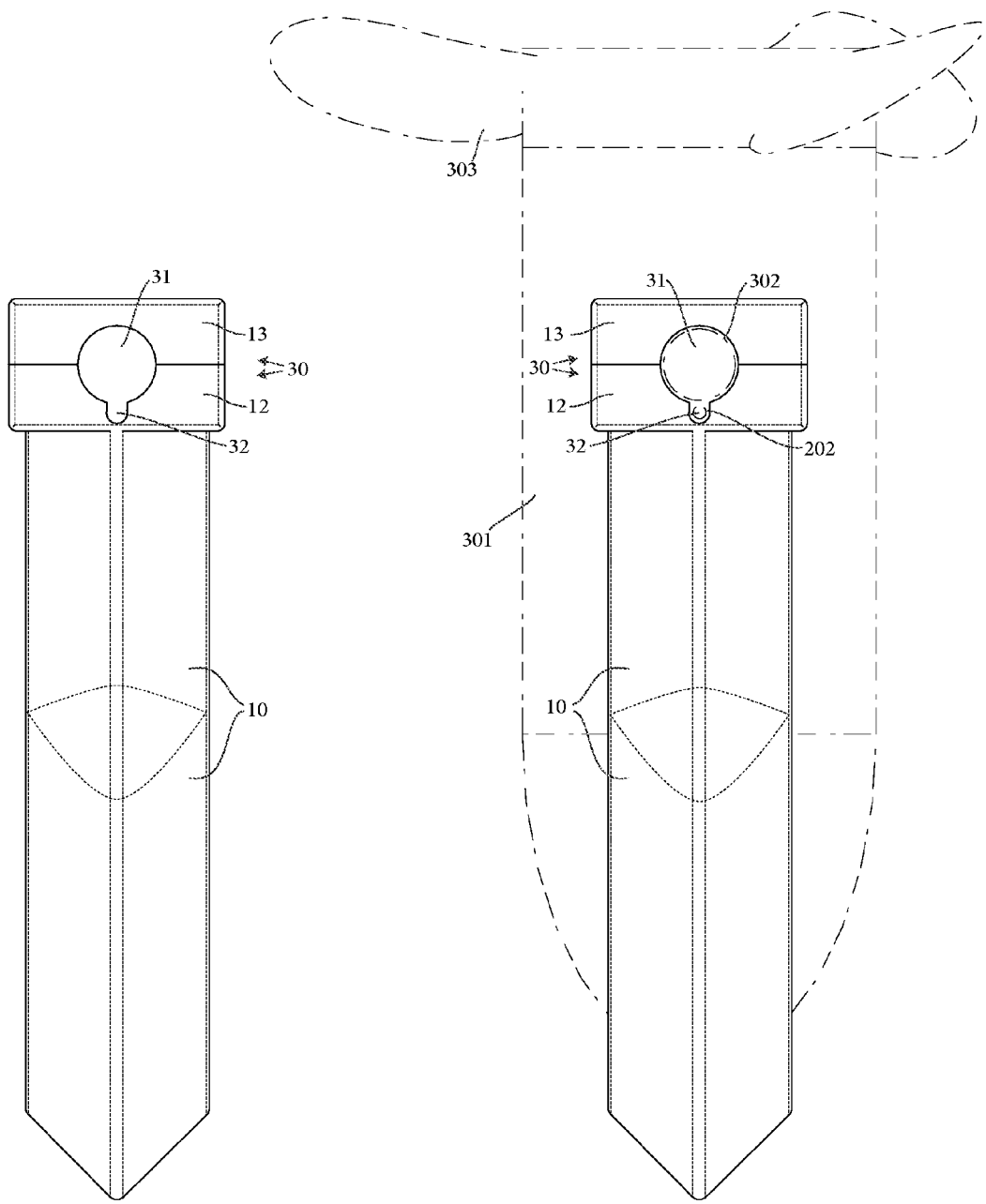
FIG. 9 is a top view of the low-disturbance trolling transducer mount of the present invention.
FIG. 10 is a top view of the low-disturbance trolling transducer mount of the present invention, showing the relationship to the transducer and trolling motor.
Figure 11:
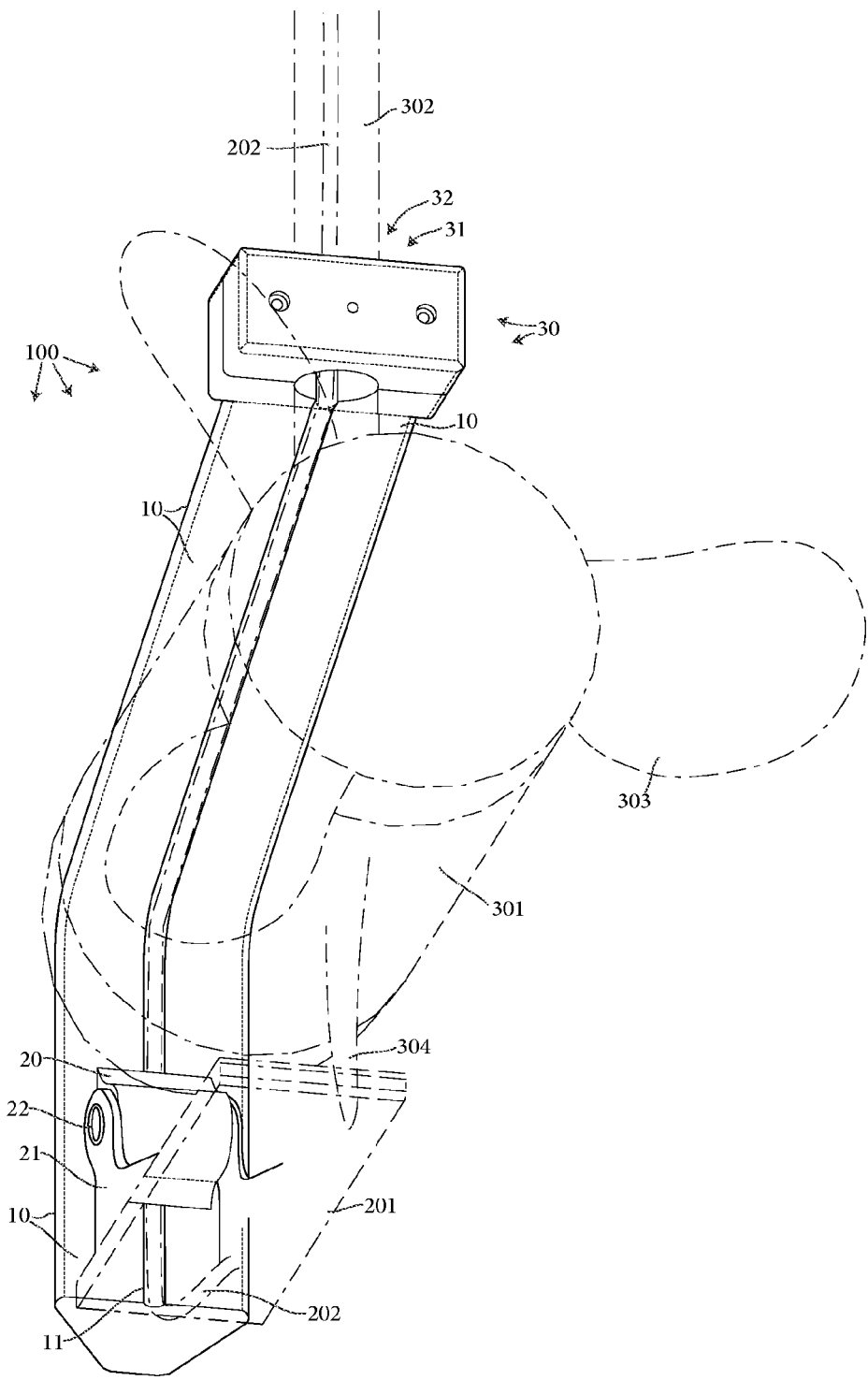
FIG. 11 is an underside isometric view of the low-disturbance trolling transducer mount of the present invention, showing the relationship to the transducer and trolling motor.

Referring to FIG. 6 & FIG. 11, in use, the fore-and-top surface of the mount frame 10 travels through the water ahead of and above the transducer 201 and the trolling motor body 301, where the smooth surface and radiused angles and joinings of the mount frame make initial contact with any vegetation and obstruction, gently pushing such vegetation or obstruction away and out of contact and potential entanglement with the transducer and trolling motor, where possible, and absorbing some of the impact with an obstruction by the smoothly bent configuration of the mount frame 10, and transferring some of the impact through the shaft connector 30 to the trolling-motor shaft 302.

Referring again to FIG. 12, the low-disturbance trolling transducer mount 100, when in use with a typical transducer and a typical trolling motor in shallow-water fishing and similar situations presenting a need to navigate through vegetation and obstructions, will provide protection against vegetation and obstructions, without disturbing or destroying the fish-inhabited vegetation, without disturbing the water around the vegetation, while placing and maintaining the transducer in the proper relation to the vegetation and to the trolling motor to avoid entanglement and turbulence affecting reliability of readings, including prevention of the trolling motor hindering the operation of the transducer, or vice versa, and allowing for movement of the transducer around obstructions and heavy vegetation, with a streamlined design and durable construction.

Many changes and modifications can be made in the present invention without departing from the spirit thereof. I therefore pray that my rights to the present invention be limited only by the scope of the appended claims.

I claim:

1. A low-disturbance trolling transducer mount system for a waterborne vessel having a transducer with a transducer cable and a trolling motor with a trolling-motor shaft, operating in shallow water having vegetation and obstructions, the low-disturbance trolling transducer mount system comprising:
   a mount frame smoothly bent into an angle, having a fore-and-top surface and an aft-and-bottom surface, and a fore end and an aft end;
   a mount channel in said aft-and-bottom surface of said mount frame, adapted to accommodate the transducer cable;
   a shaft connector comprising a connector fore-piece fixed to said aft end of said mount frame, and a connector aft-piece attached to said connector fore-piece using at least one connector closure;
   a shaft opening in said shaft connector adapted to accommodate the trolling-motor shaft;
   a connector channel in said shaft connector adapted to accommodate the transducer cable;
   a transducer-arm anchor fixed to said aft-and-bottom surface near said fore end of said mount frame;
   at least one transducer arm adapted to rotatably mount the transducer to said transducer-arm anchor, using at least one transducer-arm fastener;
   where said mount frame is adapted to present smooth surfaces and no capture points when moving through vegetation and obstructions, thereby moving vegetation and obstructions aside;
   where said mount frame is adapted to shield the transducer and the trolling motor from entanglement in or impact with vegetation and obstructions, thereby protecting and maintaining the proper operations of the transducer and the trolling motor;

where the spatial relationship between said shaft connector and said transducer-arm anchor is adapted to maintain an optimal placement of the transducer relative to the trolling motor; and where said transducer arm is adapted to allow rotation about said transducer-arm anchor to avoid obstructions.

2. The low-disturbance trolling transducer mount system of claim 1, further comprising at least one shaft setscrew securing the trolling-motor shaft within said shaft opening in said shaft connector.

3. The low-disturbance trolling transducer mount system of claim 1, further comprising hold-downs adapted to hold and support the transducer cable within said mount channel.

4. The low-disturbance trolling transducer mount system of claim 1, further comprising a safety bracket adapted to further shield the trolling motor from entanglement or impact from vegetation or obstructions.

5. The low-disturbance trolling transducer mount system of claim 1, further comprising a safety bumper adapted to further support and to cushion the forward point of the trolling motor.

6. The low-disturbance trolling transducer mount system of claim 1, where said mount frame further comprises a smooth angular bend of from 60-to-80 degrees from vertical.

7. The low-disturbance trolling transducer mount system of claim 1, where said mount frame further comprises a smooth angular bend of from 65-to-75 degrees from vertical.

8. The low-disturbance trolling transducer mount system of claim 1, where said mount frame is made primarily of aluminum.

9. The low-disturbance trolling transducer mount system of claim 1, where said mount frame is made primarily of steel.

10. The low-disturbance trolling transducer mount system of claim 1, where said mount frame is made primarily of plastic material.

11. The low-disturbance trolling transducer mount system of claim 1, where said mount frame is made primarily of carbon-fiber material.

12. A low-disturbance trolling-transducer-mount method for optimal operation of a waterborne vessel having a transducer and a trolling motor, operating in shallow water having vegetation and obstructions, the low-disturbance trolling-transducer-mount method comprising:

providing a low-disturbance trolling transducer mount for a waterborne vessel having a transducer with a transducer cable and a trolling motor with a trolling-motor shaft, the low-disturbance trolling transducer mount comprising:

a mount frame smoothly bent into an angle, having a fore-and-top surface and an aft-and-bottom surface, and a fore end and an aft end;

a mount channel in said aft-and-bottom surface of said mount frame, adapted to accommodate the transducer cable;

a shaft connector comprising a connector fore-piece fixed to said aft end of said mount frame, and a connector aft-piece attached to said connector fore-piece using at least one connector closure;

a shaft opening in said shaft connector adapted to accommodate the trolling-motor shaft;

a connector channel in said shaft connector adapted to accommodate the transducer cable;

a transducer-arm anchor fixed to said aft-and-bottom surface near said fore end of said mount frame;

at least one transducer arm adapted to rotatably mount the transducer to said transducer-arm anchor, using at least one transducer-arm fastener;

where said mount frame is adapted to present smooth surfaces and no capture points when moving through vegetation and obstructions, thereby moving vegetation and obstructions aside;

where said mount frame is adapted to shield the transducer and the trolling motor from entanglement in or impact with vegetation and obstructions, thereby protecting and maintaining the proper operations of the transducer and the trolling motor;

where the spatial relationship between said shaft connector and said transducer-arm anchor is adapted to maintain an optimal placement of the transducer relative to the trolling motor; and where said transducer arm is adapted to allow rotation about said transducer-arm anchor to avoid obstructions;

mounting said low-disturbance trolling transducer mount to the trolling-motor shaft;

mounting the transducer on said transducer arm and rotatably mounting said transducer-arm-and-transducer assembly on said transducer-arm anchor using said transducer-arm fastener;

operating the waterborne vessel in shallow water having vegetation and obstructions, where said low-disturbance trolling transducer mount shields the transducer and the trolling motor from entanglement in or impact with vegetation and obstructions, and maintains optimal placement of the transducer relative to the trolling motor.

13. The low-disturbance trolling-transducer-mount method of claim 12, where said low-disturbance trolling transducer mount further comprises at least one shaft setscrew securing the trolling-motor shaft within said shaft opening in said shaft connector.

14. The low-disturbance trolling-transducer-mount method of claim 12, where said low-disturbance trolling transducer mount further comprises hold-downs adapted to hold and support the transducer cable within said mount channel.

15. The low-disturbance trolling transducer mount method of claim 12, where said low-disturbance trolling transducer mount further comprises a safety bracket adapted to further shield the trolling motor from entanglement or impact from vegetation or obstructions.

16. The low-disturbance trolling-transducer-mount method of claim 12, where said low-disturbance trolling transducer mount further comprises a safety bumper adapted to further support and to cushion the forward point of the trolling motor.

17. The low-disturbance trolling-transducer-mount method of claim 12, where said mount frame further comprises a smooth angular bend of from 60-to-80 degrees from vertical.

18. The low-disturbance trolling-transducer-mount method of claim 12, where said mount frame further comprises a smooth angular bend of from 65-to-75 degrees from vertical.

19. The low-disturbance trolling-transducer-mount method of claim 12, where said mount frame is made primarily of aluminum.

20. The low-disturbance trolling-transducer-mount method of claim 12, where said mount frame is made primarily of steel.

* * * * *